Aug. 23, 1949.　　　A. BERTEA　　　2,479,807
PIN-TYPE COUPLING
Filed Dec. 18, 1947
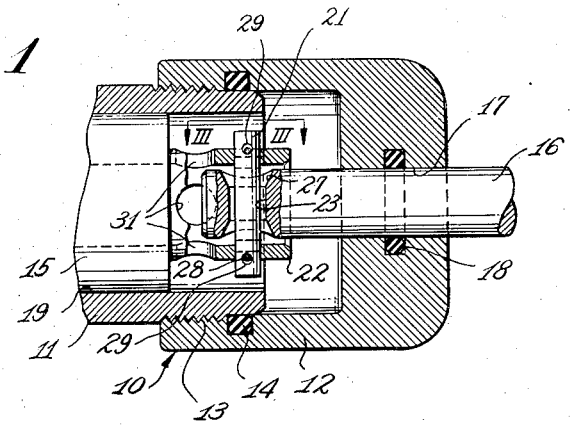
Fig. 1
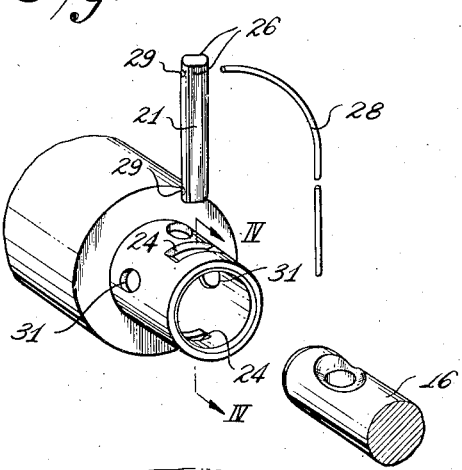
Fig. 2
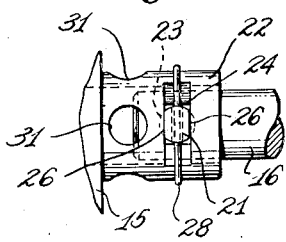
Fig. 3
Fig. 4
INVENTOR.
ALEX BERTEA
BY Harold W. Mattingly
Attorney Patented Aug. 23, 1949

2,479,807

UNITED STATES PATENT OFFICE 2,479,807

PIN-TYPE COUPLING

Alex Bertea, Pasadena, Calif.

Application December 18, 1947, Serial No. 792,504

3 Claims. (Cl. 287—119)

My invention relates to pin-type couplings, and has particular reference to a pin-type coupling permitting small lateral displacements of the coupled members.

In the design and manufacture of many mechanical parts and machines it is necessary to make surfaces concentric. This is not ordinarily a problem when tolerances are ample with respect to the machine tools available, particularly when the two surfaces are formed on a single piece of metal or other structural material. The problem becomes acute, however, when the tolerances are minute and the concentricity must be established between two separate parts that are joined together.

For example, in constructing hydraulic actuating cylinders for aircraft, especially for high pressure (3,000 to 5,000 p. s. i.) systems, the tolerances are necessarily minute to prevent leakage and to insure satisfactory operation. Further, it is necessary or desirable to machine separately the barrel and the end caps of cylinders, and accordingly these end caps are threaded to a tubular barrel to form the cylinder housing. The piston within the barrel and the piston rod passing through an end cap are necessarily concentric, requiring that the interior of the barrel and the bore for the piston rod be concentric within a tolerance of several ten-thousandths of an inch.

While expert machinists employing precision machine tools can hold such tolerances, it is uneconomic to hold these tolerances for large quantity production. The forming of threads on the barrel that are concentric with the inside diameter and the forming of threads on the end cap that are concentric with the piston rod bore give rise to four separate possibilities wherein concentricity error may occur. My present invention avoids the entire problem of concentricity tolerances and errors by providing a coupling between piston rods and pistons and like concentric parts that provides for lateral discrepancies in concentricity. Accordingly the threads on the barrel may be slightly acentric with respect to the inside diameter, and likewise on the end cap the threads may be acentric with respect to the piston rod bore, and vice versa. Further, angular discrepancies between the barrel inside diameter and the piston rod bore may be accommodated.

The resulting efficiencies in mass producing precision parts are obvious. The threads and bores may be accurately formed with good quality machines, with the primary attention being directed to the particular machining operation being performed. Minor acentricities, however, will not result in the scrapping of valuable components which may have received several hours of expensive precision machining and finishing in addition to the initial material and forming cost. Also the parts joined by my coupling construction are strongly interconnected by a long-life mechanism.

It is therefore an object of my invention to provide an improved pin-type coupling permitting lateral displacements of the coupled parts.

Another object of my invention is to provide a pin-type coupling for parts normally concentric, but accommodating reasonable concentricity tolerances.

Another object of my invention is to provide an improved pin-type coupling that is inexpensive to manufacture and which accommodates concentricity discrepancies.

Other objects and advantages of my invention will be apparent in the following description and claims, considered together with the accompanying drawings, in which Fig. 1 is a sectional view through an illustrative actuating cylinder wherein the piston and piston rod are interconnected by a coupling construction embodying my invention;

Fig. 2 is an exploded perspective view of the coupling of Fig. 1;

Fig. 3 is a plan view of the coupling of Fig. 1; and

Fig. 4 is an enlarged sectional view through the tubular member of the coupling illustrating the manner in which a milling cutter may be employed to aperture the tube.

While I will describe my invention with respect to an actuating cylinder, it will be obvious that it is applicable to various other types of machinery and apparatus. For example, in the aircraft hydraulic line it is applicable to the slide valves, hand pumps, and other similar mechanisms using a sealed rod passing through a wall of a housing.

Referring to Fig. 1, there is illustrated a fragmentary hydraulic actuating cylinder 10 including a barrel 11 having an end cap 12 secured thereto as by a threaded connection 13. Hydraulic fluid under pressure may be introduced into the cylinder by any suitable means, for example by a fitting not shown, and leakage of this fluid through the thread joint 13 may be prevented by an O-ring seal 14 which for example may be disposed in the end cap 12.

Sliding within the barrel 11 may be a piston 15 connected to a piston rod 16 which passes through the end cap 12 by means of a bore 17. Leakage of fluid around the piston rod 16 is prevented by an O-ring 18 disposed within an intermediate portion of the bore 17.

In the actual production of the hydraulic cylinder 10, the interior bore 19 of the barrel 11 will be first machined and then later honed or burnished to a mirror finish. The threads are normally formed on the barrel 11 prior to the mirror finish, but whether they are formed before or after the finishing of the bore 19, it is almost a certainty that there will be a concentricity error between the threads and the bore of at least a few ten-thousandths of an inch, and ordinarily several thousandths of an inch, regardless of the care exercised. Nor can modern honing machines correct for any such discrepancies in concentricity without undue complication of operation. Likewise the piston rod bore 17 must be concentric with its threads, but here again there is the certainty of a concentricity discrepancy of appreciable dimension, regardless of the care exercised. These acentricities are accommodated, however, by my pin-type connection employing as the joining medium a pin 21.

In forming the pin coupling, I prefer to make one of the joined members in tubular form, for example by providing the piston 15 with a tubular projection 22. The other member may telescope therein and be suitably apertured to receive the pin 21. For example, the piston rod 16 may be bored as at 23. While it would seem permissible to use a plain pin of round cross section and use merely oversize holes in the tube 22 and in the bore 23, this is not ordinarily acceptable, inasmuch as there will be considerable slap and play in the connection which is not only noisy, but provides an undesirable element of lost motion. Accordingly, therefore, I have devised my pin-type coupling so that the lost motion is practically eliminated and so that there will be little slap or noise in the connection.

In accordance with my invention, I aperture the tubular member 22 at two diametrically opposed points 24 by means of milling cuts illustrated in Fig. 4. Accordingly a milling cutter 25 may be moved against the tubular member 22, milling a pair of axially transverse slots therein, as illustrated in Fig. 4. The pin 21 is generally round in cross section, but it is provided with a pair of flats 26 on opposite sides thereof that fit closely the straight walls of the slots 24. As illustrated in Fig. 3, the length of the milled apertures 24 is somewhat in excess of the diameter of the pin 21, allowing the pin to move laterally.

The bore 23 in the piston rod 16 as illustrated in Fig. 1 appears to be greatly oversize with respect to the pin 21, but it will be noted that the pin 21 is being viewed from its side or least dimensional aspect, and that actually the bore 23 may be one- or two-thousandths of an inch undersize with respect to the pin 21 so as to obtain a drive or press fit between the bore and the pin. The drive fit not only eliminates a possible backlash factor, but also securely positions the pin in the coupling parts. To facilitate the drive fit, the ends of the bore 23 may be countersunk as at 27 so that only the center part of the shaft 16 actually bears against the pin 21.

Acentricities along a vertical line may be accommodated by the pin 21 sliding up or down in the milled slots 24, as is obvious from an inspection of Fig. 1. Acentricities in a horizontal or lateral direction may be accommodated by movement of the pin 21 transverse to its axis because of the excess of the length of the slots 24 over the diameter of the pin 21. Accordingly, therefore, acentricities of any lateral disposition may be accommodated by any combination of these two movements.

The pin 21 may be maintained in its milled slots 24 by its drive fit on shaft 16, but I prefer also to employ a lock wire 28 passing through suitable apertures 29 in each end of the pin 21. It will be noted that these wire apertures 29 are disposed considerably outward of the bottom of the mill cuts 24, and hence allow the pin 21 to move along its axis.

The size of the acentricities to be accommodated will govern the relative sizes of the different apertures of the coupling with respect to the pin. For example, if it is decided that tolerances for acentricities of five-thousandths of an inch are permissible, then the length of the aperture 24 should permit five-thousandths of an inch of clearance on each side of the pin 21. Likewise the difference between the outside diameter of the piston rod 16 and the inside diameter of the tube 22 should permit five-thousandths of an inch clearance on each side.

If the pin structure is to be employed in a slide valve, flow may take place through the tubular member 22 by providing a series of ports 31 adjacent the inner end of the rod 16. Accordingly, therefore, my coupling structure need not interfere with fluid flow, if for any reason this is desired.

In operation, my coupling may be assembled prior to the closure of the end cap 12 on the cylinder barrel 11. Acentricities will be accommodated by movement of the pin 21 up and down in the slots 24 in one plane, and by having the pin 21 move in its apertures 24 in the other dimension. The solid bearing of the flats 26 of the pin against the walls of the mill cuts 24 gives a good force transmission surface, in addition to eliminating end play or lost motion. The drive fit bearing of the rod 16 on the pin is by the circular grasp on the rounded portions of the pin, thus eliminating any end play here.

While I have described my invention with respect to a specific embodiment thereof, I do not limit myself to this embodiment, since it is obvious that various modifications could be made therein without departing from the true spirit and scope of my invention. Accordingly the disclosed embodiment is merely illustrative and not definitive.

I claim:

1. A pin-type coupling between a tube and a member telescoping within a tube comprising: diametrically opposed mill cuts on the tube that aperture the tube; a pin insertable through the tube mill cut apertures and having a generally round cross section with opposite sides flatted, the two pin flats being adapted to lie against the opposite edges of the mill cut; and a bore through the member having a diameter slightly less than the pin diameter, whereby the pin may have a drive fit in the bore and the flats of the pin give a sliding bearing on the tube.

2. A pin-type coupling comprising: a tubular member; a shaft adapted to telescope therein; diametrically opposed mill cuts on the tube disposed axially transverse thereof to define straight sided apertures; a bore through the shaft; and a pin disposed in the cuts and passing through the bore and having opposite sides flatted to bear against the straight sides of the mill cut apertures.

3. A pin-type coupling comprising: a pin having a generally rounded cross section but having opposite sides flatted; a tube having transverse diametrically opposed mill cuts of a width equal to the flatted dimension of the pin and forming apertures of greater length than the pin diameter; and a rod disposable within the tube and having an outside diameter less than the inside diameter of the tube and having a pin receiving bore therethrough that is slightly less than the pin diameter, whereby acentricities may be accommodated by movement of the pin lengthwise of the mill cuts and by movement along the axis of the pin.

ALEX BERTEA.

REFERENCES CITED

The following references are of record in the file of this patent:

UNITED STATES PATENTS

| Number | Name | Date |
| --- | --- | --- |
| 1,107,881 | Berntsen et al. | Aug. 18, 1914 |